No. 790,863. PATENTED MAY 23, 1905.
J. H. ANDERSON.
OIL GAS FURNACE.
APPLICATION FILED SEPT. 12, 1901.
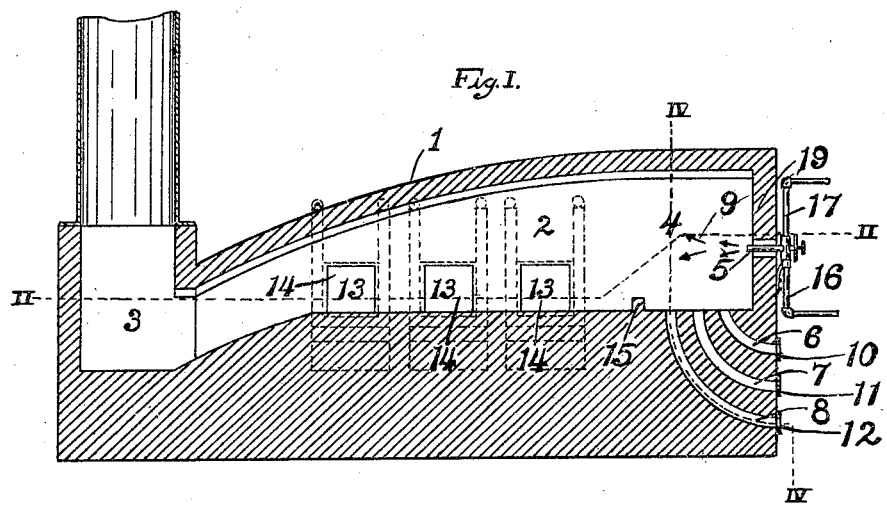
Fig. I.
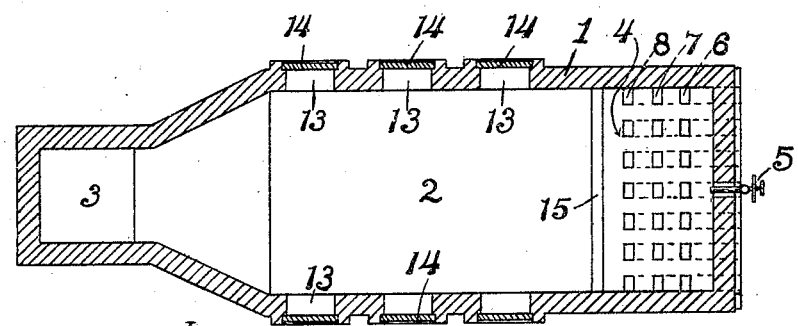
Fig. II.
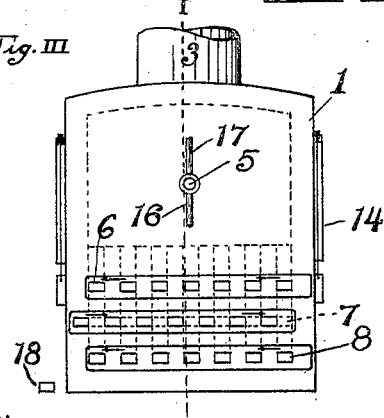
Fig. III.
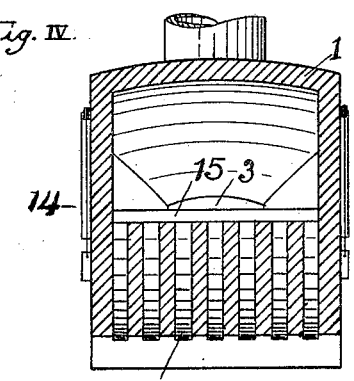
Fig. IV.
Witnesses.
C. F. Richey.
J. Townsend.
Inventor:
John H. Anderson
by Townsend Bro
his Attys No. 790,863.

Patented May 23, 1905.

UNITED STATES PATENT OFFICE.

JOHN H. ANDERSON, OF LOS ANGELES, CALIFORNIA, ASSIGNOR TO CALIFORNIA INDUSTRIAL COMPANY, OF LOS ANGELES, CALIFORNIA, A CORPORATION OF CALIFORNIA.

OIL-GAS FURNACE.

SPECIFICATION forming part of Letters Patent No. 790,863, dated May 23, 1905.

Application filed September 12, 1901. Serial No. 75,226.

*To all whom it may concern:*

Be it known that I, JOHN H. ANDERSON, a citizen of the United States, residing at Los Angeles, in the county of Los Angeles and State of California, have invented a new and useful Oil-Gas Furnace, of which the following is a specification.

An object of this invention is to produce a furnace having a direct gas-converter which will burn oil of any gravity and produce gas in said gas-converter in sufficient quantities and so commingled with oxygen as to produce in the heating-chamber of the furnace any desired heat.

An object of this invention is to provide a superior furnace suitable for readily heating large iron and steel bodies to welding heat; but it is to be understood that I do not limit the invention to any special work and may apply it generally for heating and melting.

The principle of this invention is that gas is produced by a low combustion of hydrocarbon oil and oxygen under the direct action of the furnace heat from the heating-chamber in a gas-converter constructed to deliver said gas directly into the heating-chamber where the high combustion takes place, the high combustion being produced by the introduction of oxygen admitted through inlets at the bottom of the gas-converter, the inlets being so regulated that the supply of oxygen is delivered in quantity and at points to secure the desired degree of combustion. The air is preferably introduced into the gas-converter in measured quantities underneath the body of vaporized oil and steam and the gases produced therefrom, thence to expand upward under the action of the intense heat of the furnace and to be commingled with the vaporized oil and steam and gas produced therefrom and entrained into the heating-chamber of the furnace. Furthermore, the oxidation of the contents of the furnace can be regulated by regulating the introduction of the air.

The accompanying drawings illustrate my invention in one of the forms in which it may be applied.

Figure I is a longitudinal section of a furnace embodying my invention. Line I I, Fig. III, indicates the line of section. Fig. II is a plan section of the furnace on irregular line II II, Fig. I. Fig. III is an elevation of the end of the furnace looking to the left in Fig. II. Fig. IV is a sectional elevation on irregular line IV IV, Fig. I.

1 indicates the body of the furnace; 2, the heating-chamber; 3, the outlet therefrom; 4, the gas-converter opposite said outlet; 5, an oil-injector constructed and arranged to inject vaporized oil into said converter 4; 6, 7, and 8, air-inlets in the form of ducts opening through the floor of the gas-converter beneath the injected vapors, (indicated by the arrows 9 in Fig. I.)

10, 11, and 12 indicate dampers constituting means for controlling the flow of air through the ducts to admit a measured supply of air through one or more of the air-ducts 6, 7, and 8, respectively. There is a series of passages each comprising a plurality of parallel ducts 8, having their outlets in the same horizontal line in the bottom of the furnace-chamber, and two other series 6 and 7, each comprising a plurality of parallel ducts and each series having the outlets in a horizontal line at a different distance from the mouth of the furnace. The air inlets or ducts 6, 7, and 8 are continuous-walled or without side passages or branches, so as to lead all of the air entering each inlet to a definite place at the bottom of the furnace-chamber in distinction to constructions, such as checker-work, wherein the air is distributed promiscuously. Furthermore, the terminations of these ducts in the bottom of the furnace-chamber are arranged in rows across the furnace-chamber, and there are a series of such rows at variant distances from the burner, so that by operation of the independent dampers of the respective inlets or ducts the amount of air supplied at each point in the floor of the furnace or gas-converter chamber may be regulated independently of the supply at any other point. Concentration of the heat and of the combustion at any one point to the detriment of other points can thus be prevented and the gradual and thorough combustion of the gas be insured. Furthermore, these inlets lead in a curve from the front wall of the furnace to the bottom of the converter-chamber, so as to bring the dampers at the front ends into convenient position for operation and yet lead the air by the path of least resistance to the bottom of the gas-converter.

13 indicates openings in the side wall of the furnace through which the objects to be heated will be inserted. 14 indicates the usual doors for closing said openings.

15 indicates a deflector, preferably a bridge-wall, extending upward from the floor between the air-ducts and the heating-chamber to deflect the air upward after the same enters the gas-converter 4.

16 and 17 indicate the oil and steam supply pipes for the injector 5.

In practice the injector 5 is started into operation and the vapors therefrom ignited by a piece of burning waste or other suitable means, and air is admitted through the ducts in such a manner as to produce the desired fire. For example, to produce a mild fire the ducts 7 and 8 will be closed and the ducts 6 opened, thus supplying oxygen to the gas-converter 4 near the place at which the combustible is introduced. If a hotter fire is required, the ducts 7 will also be opened. For a very intense heat the ducts 8 will also be opened. The amount of combustible oil admitted to the furnace will preferably be increased or decreased to correspond with the greater or less quantity of oxygen admitted.

The furnace may be variously constructed in any size and proportions which may be found advisable and effective. In the form shown in the drawings the gas-converter 4 extends about four feet along the furnace, and the air-inlets 6, 7, and 8 are one, two, and three feet, respectively, from the rear wall 19 of the furnace.

The character of the gas formed in gas-converter 4 by the mixture of the combustible vapors and oxygen varies, depending upon the distance from the heating-chamber at which the oxygen is admitted. If admitted close to the heating-chamber underneath the body of the combustible vapors or gases, the oxygen will have a greater tendency to oxidize the contents of the heating-chamber than will be the case when the oxygen is admitted at a greater distance from the heating-chamber.

Any suitable means may be applied to close, to a greater or less degree, any of the air-ducts while other air-ducts are open, thus varying the character of the gas formed at different parts of the gas-converter, and consequently varying the character of the fire at different parts of the furnace. The plug 18 (shown in Fig. III) indicates a form of such means.

The injector may be of any suitable construction, and any suitable means may be employed to introduce oxygen in the form of atmospheric air or in any other desired form to the combustibles on their way to the heating-chamber.

What I claim, and desire to secure by Letters Patent of the United States, is—

1. A furnace provided with a gas-converter, an injector-burner, and transversely-arranged series of continuous-walled air-conduits leading into the furnace, the entrances to said series being arranged one above the other in the front wall and the outlets being arranged in the bottom of the furnace and at variant distances to the rear of the burner and means for controlling the admission of air to each series independently of the others.

2. A furnace provided with a gas-converter and a burner therefor, said furnace having formed in its floor a plurality of continuous-walled ducts each opening at the front of the furnace and terminating at its rear end in the bottom of the gas-converter, said rear ends of said ducts being arranged in rows transversely of the gas-converter, and said rows being arranged in series at various distances from the burner, and means for controlling the passage of air through each of said rows of ducts independent of the others.

3. A furnace provided with a gas-converter and a burner therefor, said furnace having formed in its floor a plurality of curved continuous-walled ducts each opening at the front of the furnace and terminating at its rear end in the bottom of the gas-converter, said rear ends of said ducts being arranged in rows transversely of the gas-converter, and said rows being arranged in series at various distances from the burner, and means for controlling the passage of air through each of said rows of ducts independent of the others.

In testimony whereof I have signed my name to this specification, in the presence of two subscribing witnesses, at Los Angeles, California, this 7th day of September, 1901.

J. H. ANDERSON.

Witnesses:
JAMES R. TOWNSEND,
JULIA TOWNSEND.